United States Patent [19]
Asberg

[11] 3,884,331
[45] May 20, 1975

[54] BEARING UNIT

[75] Inventor: Sture L. Asberg, Partille, Sweden

[73] Assignee: SKF Industrial Trading and Development Company B.V., Overtoom, Amsterdam-W, Netherlands

[22] Filed: Nov. 1, 1973

[21] Appl. No.: 411,855

[30] Foreign Application Priority Data
Nov. 9, 1972 Netherlands............... 7215139
Nov. 28, 1972 Netherlands............... 7216088

[52] U.S. Cl................ 188/18 A; 308/191; 280/96.1
[51] Int. Cl................................................. B60t 1/06
[58] Field of Search............ 188/18 R, 18 A, 264 A; 308/191; 301/5.7; 280/96.1

[56] References Cited
UNITED STATES PATENTS

| | | | |
|---|---|---|---|
| 2,649,337 | 8/1953 | Ware | 301/5.7 |
| 2,862,578 | 12/1958 | Waker | 188/18 A |
| 2,970,673 | 2/1961 | Iskell | 188/18 A |
| 3,171,527 | 3/1965 | Ott | 188/264 A |
| 3,367,458 | 2/1968 | Self et al. | 188/18 A |
| 3,583,511 | 6/1971 | Asberg | 308/191 |
| 3,589,747 | 6/1971 | Asberg | 280/96.1 |
| 3,819,243 | 6/1974 | Asberg et al. | 308/191 |

FOREIGN PATENTS OR APPLICATIONS

| | | | |
|---|---|---|---|
| 679,724 | 1/1965 | Italy | 280/96.1 |
| 1,004,299 | 9/1965 | United Kingdom | 188/18 A |
| 1,037,212 | 9/1953 | France | 308/191 |

*Primary Examiner*—Trygve M. Blix
*Assistant Examiner*—Edward R. Kazenske
*Attorney, Agent, or Firm*—Daniel M. Rosen

[57] ABSTRACT

A bearing unit for a wheel or similar rotary element comprising a brake device provided for example with a brake disc and a bearing having an outer and an inner ring between which rolling elements in two rows are arranged, the rings being provided with a flange to which parts of the wheel or such mechanism can be attached, characterized in that at least the inner ring, the flange and the brake device part form a single homogeneous unit, the ring forming the running surface of the two rows of rolling elements which center a cage.

7 Claims, 4 Drawing Figures

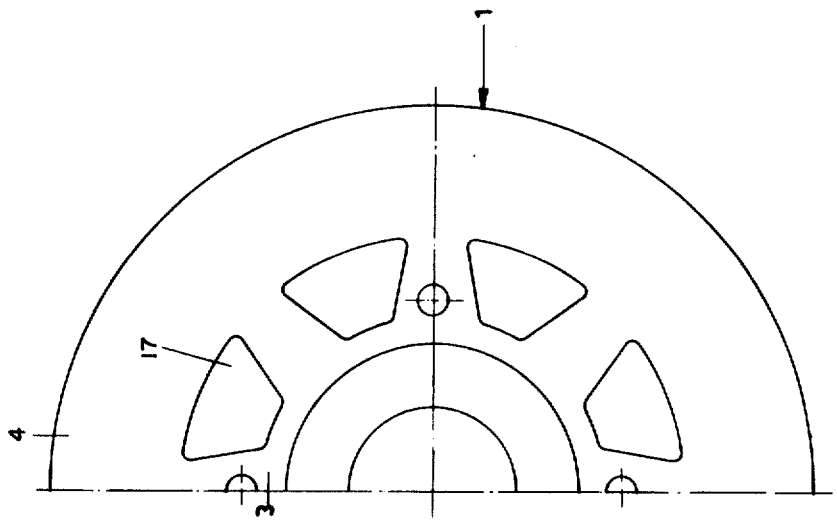
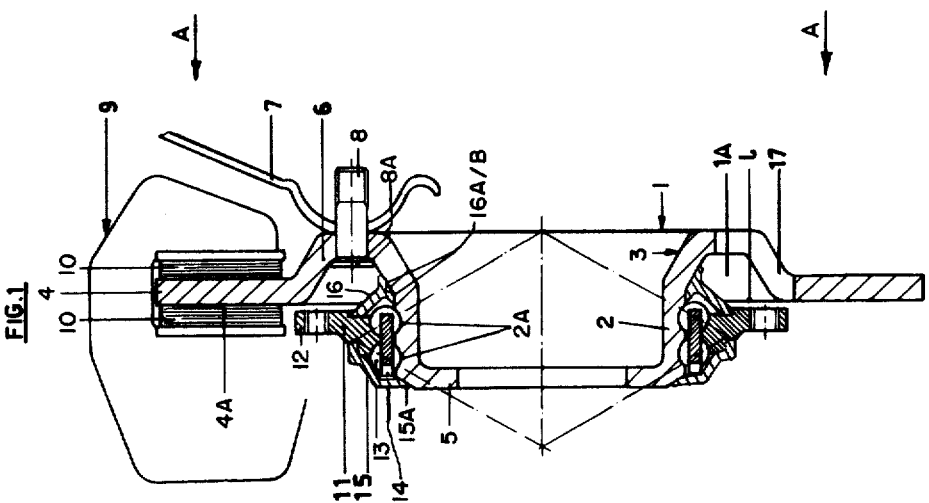

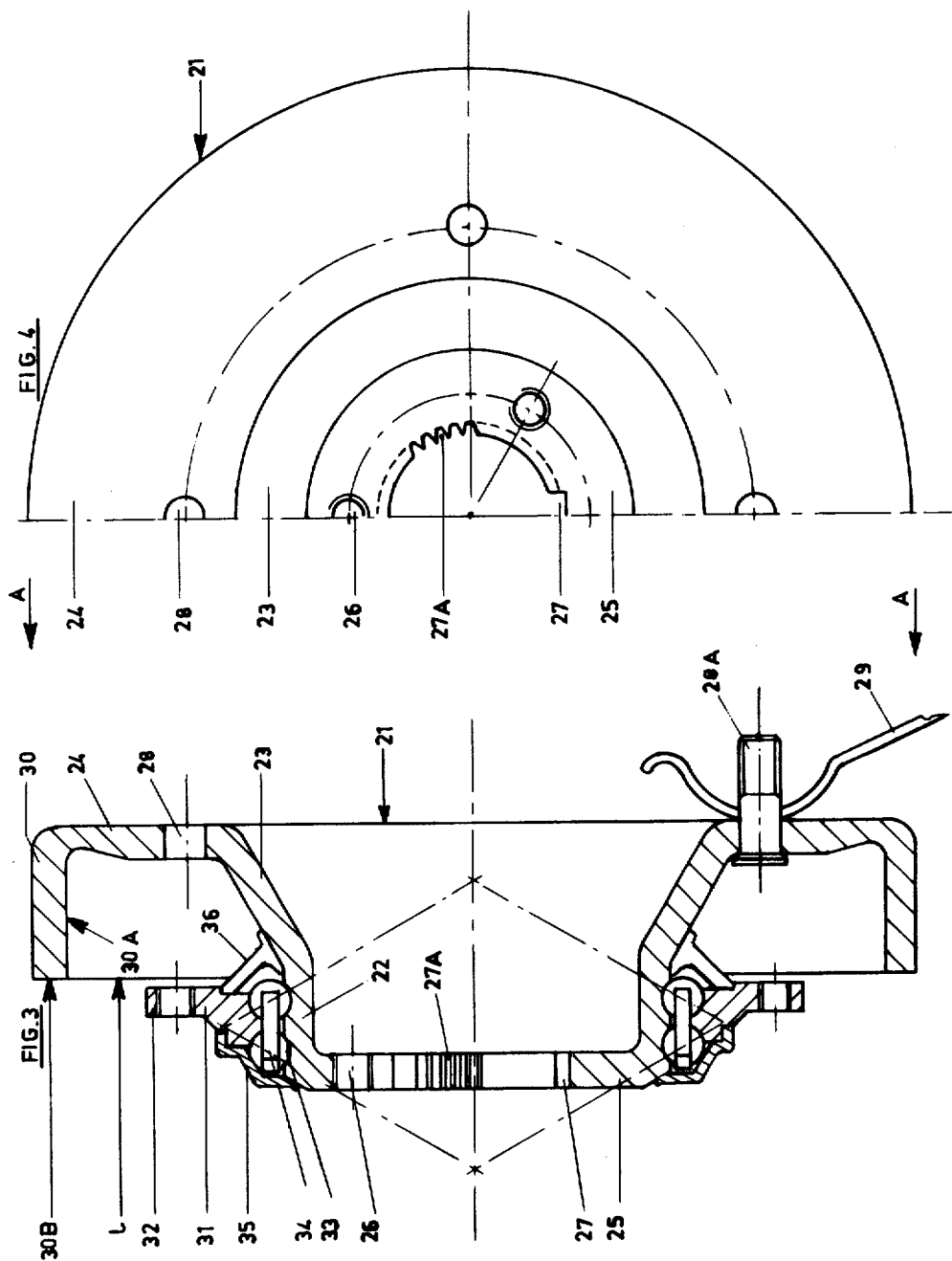

BEARING UNIT

The invention relates to bearing units, and more particularly to a bearing unit for a wheel or a similar rotary element. A bearing unit construction for a rotary element may typically include a brake device provided, for example, with a brake disc, and further with a bearing, having an outer and inner ring, between which two rows of rolling elements are arranged. The rings are unified with a flange onto which components of the wheel or such can be attached.

It is the main object of this invention to provide a bearing unit of the aforementioned type which, in comparison with a conventional bearing of identical capacity, displays a lower weight, in spite of having a considerable volume. It is another object of the invention to provide in an economically advantageous manner, high accuracy and precision for a bearing unit of such relatively large volume, thereby improving the functioning of the unit and the operational safety of the entire mechanism, into which the unit is incorporated.

In accordance with the foregoing objects, the present invention employs the inner ring, brake disc and flange as a homogeneous unit, wherein the ring forms the running surface, in which the rows of rolling elements centering a cage are partly encased. As a result of such an arrangement, the separate production and finishing treatment of ring, flange and brake disc can be dispensed with, because this bearing part can thus be exposed to all treatments simultaneously as a unit. Another advantage of such arrangement is that this important constructional element can be fully balanced and if necessary aligned before it is mounted or otherwise built into an automotive mechanism, thereby eliminating the time-consuming operations of mounting and adjustment of the separate components with regard to one another.

In U.S. Pat. No. 3,583,511, corresponding to the Dutch Patent Application No. 68.05109 of the applicant there is described a bearing of the same type wherein the brake disc and wheel flange also form a unit (see FIG. 7). However, in this bearing type the running surface consists of two separate parts; a shaft part serving as running surface for one row of rolling elements and a ring arranged in the flange. The ring is provided for housing a second row of rolling elements. Thus two different parts, the shaft-part and the flange-ring, have to be machined to be suitable to serve as a race-ring for each row of rolling elements. In addition, special readjustments of these two different parts to each other and the other bearing parts are often necessary afterwards.

The arrangement according to the invention ensures an advantageously high degree of accuracy and precision because, in accordance with the invention, the boundary planes of the brake surfaces of the brake disc or a brake drum are positioned essentially outside of the running surface of the rolling elements and perpendicularly to that running surface. As a result of such arrangement, the flange and the brake disc or brake drum advantageously do not hinder the operation of a grinding or polishing element of a grinding machine, as for example during the surface treatment of the running surface of the rolling elements. Other processes for improving the quality of the running surfaces of such rather voluminous bearing unit can be effected as well, without any practical problems. Both the flange and the brake disc or brake drum, displaying large dimensions with regard to the running surface of the ring, ensure optimum conditions for the processing of the bearing.

According to the preferable variant of the invention a bearing unit can be manufactured by the simultaneous hot or cold powder pressing of the ring, flange and brake disc or brake drum, followed by a simultaneous heat-treatment of the said elements for improving the mechanical and/or physical-chemical properties of the bearing unit. In such a way a bearing unit of high homogeneity can be obtained, ensuring optimum functioning thereof. Moreover, the manufacture of such a unit can take place in a relatively short time, whereafter checking and finishing treatments for improving the mechanical and/or physical-chemical properties of the entire unit can be easily effected.

According to another feature of the invention the ring, flange and a brake drum of the brake form a homogeneous unit, wherein the end part of the bearing facing away from the brake drum includes the coupling elements. Such an arrangement also eliminates the separate manufacture and finishing of the ring, flange and brake part, since the bearing can now be exposed, as a unit, to all treatments simultaneously.

Another advantage of such a construction is that this essential constructional element can be coupled as a unit, in a automotive machine, directly to the driving shaft. In this way the usually time-consuming mounting and adjusting processes of separate parts, with regard to one another, can be dispensed with.

In a preferable embodiment of the invention the coupling elements consists of key-ways, formed in the corresponding end part of the bearing, into which may be fitted a spline-shaft. In another advantageous embodiment of the invention spaced-apart openings are provided at the periphery of the said bearing end part for housing bolts or similar fixing elements for the said coupling.

An especially advantageous embodiment of the invention is that the flange-shaped end part of the inner ring comprises key-ways and bolt holes as well. Such arrangement extends the applicability of the bearing unit. Thus the invention provides a bearing unit of relatively large dimensions which, due to its form and composition, considerably improves, on the other hand, the functioning, the durability and the operational safety of the entire bearing and the mechanism comprising the said bearing, while on the other hand a bearing can be produced of very high accuracy and precision. Furthermore, the costs of bearing units according to the invention are low as compared to those of bearing constructions the components of which have to be manufactured separately.

The invention will now be described in detail with reference to the attached figures, whereby the advantages and various features of the invention will be revealed.

FIG. 1 represents the cross-section of a bearing unit according to the invention provided with a brake disc, the upper part showing schematically the brake casing.

FIG. 2 is a part of the lateral of the bearing unit according to the arrow A—A, the brake casing, with its components being omitted.

FIG. 3 is a cross-section of a bearing unit provided with a brake drum.

FIG. 4 is a part of the side view of the bearing unit in the direction of the arrows A—A.

The bearing unit 1 comprises an inner ring 2, which passes-on in an essentially U- or V-shaped flange part 3, which, in turn, passes-one in a brake disc. The inner ring 2 ends at the other side in a flange 5, which preferably runs parallel with and in opposed direction to the brake disc 4, thereby advantageously increasing the strength of the bearing. The flange part 3 comprises a base 6 to which a wheel part 7 is secured by bolts 8. It is advantageous that between the wheel part 7 and the brake disc 4 a space is formed into which a part of the brake casing 9 fits, thereby realizing a compact composition of the bearing unit and the brake device. The brake disc 4 co-acts in the known manner with the brake blocks 10 which can be activated by mechanical/hydraulic power.

In a preferred embodiment of the invention the brake surface 4A of the brake disc 4 contacts according to the line L of FIG. 1 the inner ring 2, outside of the running surface 2A of the said ring. Such arrangement ensures that the treatment of the running surfaces of the relatively bulky bearing unit can be carried out just as easily as in case of conventional rolling bearings.

In a preferred embodiment of the invention the innermost boundary plane (indicated by the line L) of the flange 3 joins the running surface 2A of the ring 2, outside of the running surface. Due to such special arrangement the running surfaces 2A are completely accessible for treatment with processing tools, e.g., grinding or polishing tools, which can reach the running surface of the ring 2 without any hindrance along the brake disc and the flange.

The bearing unit comprises in addition an outer ring 11, provided with a flange 12, which is also suitable for securing the not represented shaft parts. In this preferred embodiment of the invention spherical rolling elements 13 are arranged between the inner ring 2 and the outer ring 11. The rolling elements are fixed between the inner and the outer ring by means of a cage 14. The packing of the rolling elements 13 essentially consists of two seals 15 and 16, which are secured to the outer ring 11. The seals 15 and 16 are composed of a resilient material which at the same time is capable of realizing a suitable sealing even under different load conditions. For example, under variable thermal loads the end part 15A will rest against the sloping side of the flange 5 and the seal 16, respectively under essentially constant pressure, while the ends 16A and 16B of the seal 16, which are spaced-apart from one another, will also rest against the flange on the one hand and the inner ring 2 on the other hand under essentially constant pressure. Also in this case a long service life and high operational safety can be ensured by the material composition and shaping of both seals 15 and 16.

It should be noted that in order to simplify the mounting of the wheel part 7 onto the flange 3, the bolt 8 is provided with a special structure. More particularly the bolt 8 is introduced from the outside into the opening of the flange, whereafter by turning the nut (not shown in the drawing) the bolt-head 8A expands and adjusts itself to the basic form 6 of the flange 3. However, other bolt-structures or blocking connections can be applied as well.

With reference to FIG. 2, openings 17 are prpovided between the flange 3 and the brake disc 4, these openings displaying in this advantageous variant an essentially trapezoidal shape running from outside towards the inner space 1A (see the lower part of FIG. 1). Due to such construction the friction heat or braking heat is advantageously removed, while promoting the cooling in the bearing quite considerably.

As shown in FIG. 3, the bearing unit 21 comprises an inner ring which passes over into a flange-part 23 terminating into a brake drum 24. The inner ring 22 ends at the other side in a flange 25, provided with openings or bolt holes 26 and preferably at the same time also with key-ways 27 or 27A (see also FIG. 4), whereby a spline shaft, frequently used in the automobile industry, can be applied. In this manner the applicability of the bearing is extended, while at the same time is rigidity is improved by the flange 25. The flange 23 arranged at the other side of the ring 22 has a tapered or conical shape, with the flange 23 passing over into the drum 24 of a further braking device, not shown. The drum 24 is provided with openings 28 suitable for housing the fixing bolts 28A. To these bolts 28A are fastened the spokes or similar carrier elements 29 of a wheel. The brake drum 24 comprises a wide border 30, the inner side 30A of which can co-operate with conventional brake segments (not represented in the drawings) in the braking action.

In this preferred embodiment the border 30B is arranged in a plane, (indicated by line L), which makes contact outside of the running surface of the inner ring 22. Such arrangement has the advantage that the finishing of the running surfaces in this relatively voluminous bearing unit can be carried out just as easily as in conventional rolling bearings since the finishing tools, which are guided to the running surface both in axial and radial direction, are also not hindered by the brake drum 30 or the flange 23.

The bearing unit 21 furthermore comprises an outer ring 31, provided with a flange 32, which is suitable for the fixation of (not represented) shafts or similar supporting elements as well. Arranged between the inner ring 22 and the outer ring 31 are spherical rolling elements 33, separated by means of a cage 34. Other rolling elements of different shape or combinations thereof can be applied as well.

The sealing of the bearing unit consists mainly of two seals 35 and 36, which are fastened to the outer ring 31. The seals 35 and 36 are made of a flexible material ensuring a safe sealing under various load conditions. The material composition and shaping of the seals 35 and 36 ensure a long surface life and high operational safety of the bearing unit.

In this way the present invention provides a bearing unit construction featuring on the one hand a favorable combination of high accuracy and precision and on the other hand a low total weight and reduced production costs.

In view of the aforementioned advantages, the completely balanced bearing unit of the invention is capable of optimum operation. Further the non-exchangeability of the bearing components, ensures a safe operation. Finally the production technology of a bearing unit according to the invention permits important savings in expenses, mainly with regard to initial investment further reduces the expenses required for servicing. Such advantages can be realized in a simple manner by manufacturing the ring, flange and brake disc or brake drum simultaneously of forged or pressed steel, and thereafter exposing the unit to an identical or non-identical surface treatment at the same the time.

I claim:

1. A bearing unit and braking device for a rotary element comprising an inner ring having as an integral one piece structure a two row bearing surface and a radially outwardly extending flange forming a braking means, said radially extending flange having an upwardly extending portion forming said braking means axially displaced from said two row bearing surface by an intermediate portion of said radially extending flange spacing said two row bearing surface from said upwardly extending portion such that the boundary plane of said braking means is axially displaced from the entire area defining said two row bearing surface, a plurality of roller elements, and an outer ring having a two row bearing surface positioned about said inner ring bearing surface with two rows of said roller elements therebetween.

2. A bearing unit as set forth in claim 1 wherein said inner ring includes a further inwardly extending flange portion directed oppositely from said radially extending flange.

3. A bearing unit as set forth in claim 1 wherein said inner ring includes a further inwardly extending flange portion directed oppositely from said radially extending flange, said further inwardly extending flange including a plurality of coupling elements for coupling said inner ring to a shaft.

4. The bearing unit of claim 3 wherein said coupling elements are integrally formed with said further flange portion.

5. The bearing unit of claim 3 wherein said coupling elements include a keyway formed in said further flange portion.

6. The bearing unit of claim 1 wherein said roller elements are enclosed by a first sealing means positioned between said inner ring intermediate portion and said outer ring, and a second sealing means positioned between said outer ring and said inner ring on the side adjacent said inner ring bearing surface opposite the side of said inner ring bearing surface contactd by said first sealing means.

7. A bearing unit for a braking device having an externally accessible inner ring bearing surface, comprising an inner ring having as an integral one piece homogeneous structure a bearing surface for two parallel rows of roller elements, an outwardly extending radial flange including a first inner flange portion adjoining said bearing surface, a second inner flange portion adjoining said first inner flange portion and including mounting means positioned thereon, and a third portion forming a braking means, said first inner flange portion axially displacing said second and third portions sucn that the boundary plane of said braking means is sufficiently axially spaced from said bearing surface so as to completely expose said bearing surface in the radial direction for external access, an inwardly extending flange extending oppositely from said third portion of said outwardly extending radial flange, said inwardly extending flange including coupling means integrally formed therewith, an outer ring mountable over said inner ring and having a bearing surface, and two rows of roller elements encaged therebetween, said outer ring includes an outwardly extending flange having mounting means formed thereon, and sealing means sealing in said rows of roller elements between said inner and outer rings.

* * * * *